(12) United States Patent
Muramatsu et al.

(10) Patent No.: US 11,170,813 B2
(45) Date of Patent: Nov. 9, 2021

(54) MAGNETIC POWDER, METHOD OF PRODUCING THE SAME, AND MAGNETIC RECORDING MEDIUM

(71) Applicant: Sony Corporation, Tokyo (JP)

(72) Inventors: Atsushi Muramatsu, Miyagi (JP);
Masafumi Nakaya, Miyagi (JP);
Masaru Terakawa, Miyagi (JP);
Katsunori Maeshima, Miyagi (JP);
Minoru Yamaga, Miyagi (JP)

(73) Assignee: Sony Corporation, Tokyo (JP)

( * ) Notice: Subject to any disclaimer, the term of this patent is extended or adjusted under 35 U.S.C. 154(b) by 79 days.

(21) Appl. No.: 16/321,327

(22) PCT Filed: Sep. 27, 2017

(86) PCT No.: PCT/JP2017/034934
§ 371 (c)(1),
(2) Date: Jan. 28, 2019

(87) PCT Pub. No.: WO2018/074162
PCT Pub. Date: Apr. 26, 2018

(65) Prior Publication Data
US 2019/0228800 A1 Jul. 25, 2019

(30) Foreign Application Priority Data
Oct. 17, 2016 (JP) .............................. JP2016-203962

(51) Int. Cl.
*G11B 5/712* (2006.01)
*G11B 5/706* (2006.01)
(Continued)

(52) U.S. Cl.
CPC ................ *G11B 5/712* (2013.01); *B22F 1/00* (2013.01); *B22F 1/02* (2013.01); *B22F 9/20* (2013.01); *G11B 5/706* (2013.01); *G11B 5/70642* (2013.01); *G11B 5/70678* (2013.01); *G11B 5/842* (2013.01); *H01F 1/0045* (2013.01); *H01F 1/047* (2013.01); *H01F 1/11* (2013.01);
(Continued)

(58) Field of Classification Search
None
See application file for complete search history.

(56) References Cited

U.S. PATENT DOCUMENTS 10,720,181 B1 * 7/2020 Yamaga .................. G11B 5/667
10,748,570 B2 * 8/2020 Terakawa ........... G11B 5/00813
(Continued)

FOREIGN PATENT DOCUMENTS

JP 2008063199 3/2008
JP 2008063201 3/2008
(Continued)

OTHER PUBLICATIONS

Extended European Search Report dated Aug. 21, 2019 in corresponding European Application No. 17862493.8.
(Continued)

*Primary Examiner* — Kevin M Bernatz
(74) *Attorney, Agent, or Firm* — K&L Gates LLP (57) ABSTRACT

A method of producing a magnetic powder includes performing heat treatment on first particles that contain ferrous oxide to prepare 5 second particles that contain ε-iron oxide.

11 Claims, 7 Drawing Sheets

(51) Int. Cl.
*G11B 5/842* (2006.01)
*H01F 1/047* (2006.01)
*B22F 1/02* (2006.01)
*B22F 9/20* (2006.01)
*H01F 1/11* (2006.01)
*H01F 1/00* (2006.01)
*B22F 1/00* (2006.01)

(52) U.S. Cl.
CPC ....... *B22F 2301/35* (2013.01); *B22F 2302/25* (2013.01); *H01F 1/112* (2013.01)

(56) References Cited

U.S. PATENT DOCUMENTS

| | | | | |
|---|---|---|---|---|
| 10,755,841 | B2* | 8/2020 | Terakawa | G11B 5/712 |
| 10,803,904 | B1* | 10/2020 | Yamaga | G11B 5/584 |
| 10,839,846 | B2* | 11/2020 | Yamaga | G11B 5/733 |
| 10,839,847 | B2* | 11/2020 | Terakawa | G11B 5/733 |
| 10,867,630 | B2* | 12/2020 | Sekiguchi | G11B 5/733 |
| 2004/0219353 | A1* | 11/2004 | Harasawa | G11B 5/70 428/329 |
| 2011/0027588 | A1* | 2/2011 | Hattori | B22F 1/025 428/403 |
| 2014/0219069 | A1* | 8/2014 | Hattori | G11B 5/73 369/13.14 |
| 2015/0111066 | A1* | 4/2015 | Terakawa | G11B 5/70 428/836.2 |
| 2018/0170767 | A1* | 6/2018 | Ohkoshi | C01G 49/02 |
| 2019/0295584 | A1* | 9/2019 | Terakawa | G11B 5/714 |
| 2019/0362753 | A1* | 11/2019 | Terakawa | G11B 5/714 |
| 2020/0098390 | A1* | 3/2020 | Terakawa | G11B 5/73919 |
| 2020/0312365 | A1* | 10/2020 | Yamaga | G11B 5/7334 |
| 2020/0342901 | A1* | 10/2020 | Enomoto | G11B 5/584 |
| 2020/0342902 | A1* | 10/2020 | Enomoto | G11B 5/70678 |
| 2020/0342904 | A1* | 10/2020 | Yamaga | G11B 5/78 |
| 2020/0342905 | A1* | 10/2020 | Yamaga | G11B 5/78 |
| 2020/0342908 | A1* | 10/2020 | Yamaga | G11B 5/714 |

FOREIGN PATENT DOCUMENTS

| | | |
|---|---|---|
| JP | 2008-100871 A | 5/2008 |
| JP | 2011-032496 A | 2/2011 |
| JP | 2012-212807 A | 11/2012 |
| JP | 2012-231098 A | 11/2012 |
| JP | 2016-174135 A | 9/2016 |
| WO | 2012/101752 | 8/2012 |
| WO | 2016/047559 | 3/2016 |
| WO | 2016092744 | 6/2016 |

OTHER PUBLICATIONS

Taboada, et al., Nanospheres of Silica with an e-Fe2O3 Single Crystal Nucleus, 2009 American Chemical Society, vol. 3, No. 11, 3377-382, 2009.

Hou, et al., Controlled Synthesis and Chemical Convrsions of FeO Nanoparticles, Angew. Chem. 2007, 119, 6445-6448.

Machala, et al., Polymorphous Transformations of Nanometric Iron (III) Oxide; A Review, Chemistry of Materials, 2011, 23, 3255-3272.

S. Sakurai, et al., Reorientation Phenomenon in a Magnetic Phase of ε-Fe2O3 Nanocrystal, Journal of the Physical Society of Japan, vol. 74, No. 7, Jul. 2005, pp. 1946-1949. (4 pages).

\* cited by examiner

MAGNETIC POWDER, METHOD OF PRODUCING THE SAME, AND MAGNETIC RECORDING MEDIUM

CROSS-REFERENCE TO RELATED APPLICATIONS

The present application claims the benefit of International Application No. PCT/JP2017/034934, filed Sep. 27, 2017, which claims priority to Japanese Application No. 2016-203962 filed Oct. 17, 2016, the disclosures of which are incorporated herein by reference.

BACKGROUND

The present technology relates to a magnetic powder, a method of producing the same, and a magnetic recording medium.

$\varepsilon$-iron oxide ($\varepsilon$-$Fe_2O_3$) is expected to be applied to a magnetic recording material of a coating-type magnetic recording medium. As a method of producing $\varepsilon$-iron oxide, for example, the following methods have been proposed.

In Patent Literature 1, a method of producing $\varepsilon$-$Fe_2O_3$ crystal including a heat treatment step A of producing cubic iron oxide by performing heat treatment on particles of iron oxyhydroxide ($\alpha$-FeOOH) in a temperature range of 300 to 600° C. in a weakly reducing atmosphere such as a hydrogen gas atmosphere in which water vapor is mixed, and a heat treatment step B of generating $\varepsilon$-$Fe_2O_3$ crystal from the cubic iron oxide by performing heat treatment on the particles obtained in the heat treatment step A in a temperature range of 700 to 1300° C. in an oxidizing atmosphere such as the atmosphere has been proposed.

In Non-Patent Literature 1, a method of producing $\varepsilon$-iron oxide particles by preparing iron hydroxide-based compound particles by a reverse micelle method, subjecting the particles to silica coating, and then performing heat treatment thereon has been proposed.

SUMMARY

Technical Problem

However, in the $\varepsilon$-iron oxide obtained by the above-mentioned production method, variation in particle size is large, which may deteriorate the magnetic properties.

It is an object of the present technology to provide a magnetic powder having excellent magnetic properties, a method of producing the same, and a magnetic recording medium.

Solution to Problem

In order to solve the above-mentioned problem, a first technology is a method of producing a magnetic powder, including: performing heat treatment on first particles that contain ferrous oxide to prepare second particles that contain $\varepsilon$-iron oxide.

A second technology is a magnetic powder, including: particles containing $\varepsilon$-iron oxide, in which a coefficient of variation represented by the following formula (1) is not more than 30%, and a ratio Y/X of a sub-peak height Y near a zero magnetic field to a main peak height X in an SFD (Switching Field Distribution) curve is not more than 0.5.

Coefficient of variation [%]=([Standard deviation of particle diameter]/[Average particle diameter])× 100     (1)

A third technology is a magnetic recording medium, including: a recording layer that includes particles containing $\varepsilon$-iron oxide, in which $\delta$/Mrt satisfies a relationship represented by the following formula (2), and a ratio Y/X of a sub-peak height Y near a zero magnetic field to a main peak height X in an SFD (Switching Field Distribution) curve is not more than 0.5.

$$2.0 \leq \delta/Mrt \leq 120.0 \quad (2)$$

(in which $\delta$ [nm] is an average thickness of the recording layer and Mrt [mA] is a product of a residual magnetization amount and a thickness of the recording layer.)

Advantageous Effects of Invention

In accordance with the present technology, it is possible to realize a magnetic powder having excellent magnetic properties.

DETAILED DESCRIPTION

Embodiments of the present technology will be described in the following order.

1 First Embodiment (Example of Magnetic Powder)
2 Second Embodiment (Example of Magnetic Powder)
3 Third Embodiment (Example of Magnetic Powder)
4 Fourth Embodiment (Example of Magnetic Recording Medium)

1 First Embodiment

[Configuration of Magnetic Powder]

A magnetic powder according to a first embodiment of the present technology contains a powder of nanoparticles containing ε-iron oxide (hereinafter, referred to as "ε-iron oxide particles"). The magnetic powder according to the first embodiment is suitable for use as a recording layer (magnetic layer) of a magnetic recording medium having high density. It is favorable that the ε-iron oxide contained in ε-iron oxide particles has ε-$Fe_2O_3$ crystal (including those in which a part of the Fe site is substituted with a metal element M) as the main phase. It is more favorable that the ε-iron oxide is formed of ε-$Fe_2O_3$ in a single phase. The metal element M represents, for example, one or more selected from the group consisting of Al, Ga, and In. However, when the molar ratio of M and Fe in the iron oxide is expressed as M:Fe=x: (2−x), 0≤x<1.

In the present technology, the ε-$Fe_2O_3$ crystal includes, unless otherwise specified, crystal in which a part of the Fe site is substituted with a trivalent metal element M and the space group is the same as that of pure ε-$Fe_2O_3$ crystal (i.e., the space group is $Pna2_1$) in addition to pure ε-$Fe_2O_3$ crystal in which the Fe site is not substituted with another element.

(Coefficient of Variation)

The coefficient of variation of the magnetic powder represented by the following formula (1) is not more than 30%.

Coefficient of variation [%]=([Standard deviation of particle diameter]/[Average particle diameter])×100    (1)

When the coefficient of variation exceeds 30%, the variation in particle size of ε-iron oxide particles becomes large, and there is a possibility that variation in magnetic properties of the magnetic powder becomes large.

The coefficient of variation of the magnetic powder described above is obtained as follows. First, a magnetic powder is imaged by using a transmission electron microscope (TEM). Next, 500 ε-iron oxide particles are randomly selected from the TEM image, and the area S of each particle is obtained. Next, assuming that the cross-sectional shape of the particle is circular, the particle diameter (diameter) R of each particle is calculated as particle size on the basis of the following formula to obtain the particle size distribution of the magnetic powder.

$R=2\times(S/\pi)^{1/2}$

Next, the median diameter (50% diameter, D50) is obtained from the obtained particle size distribution, and this is taken as an average particle size $D_{ave}$. Further, a standard deviation σ is obtained from the obtained particle size distribution. Next, $\sigma/D_{ave}$ is calculated from the obtained average particle size $D_{ave}$ and the standard deviation σ of the particle size distribution, and this is calculated as a coefficient of variation.

(SFD)

Figure 1:
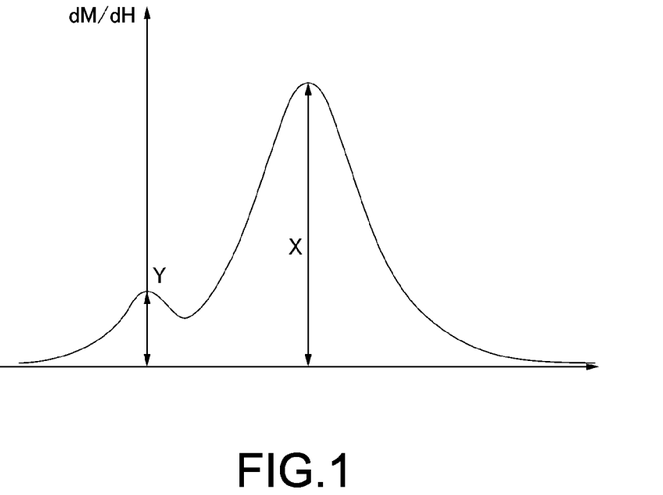
FIG. 1 is a graph showing an example of an SFD curve.

In the SFD (Switching Field Distribution) curve of the magnetic powder, the ratio Y/X of a sub-peak height Y near the zero magnetic field to a main peak height X is not more than 0.5 (see FIG. 1). When the ratio Y/X exceeds 0.5, variation in particle size of the ε-iron oxide particles becomes large, and there is a possibility that variation in magnetic properties of the magnetic powder becomes large.

The above-mentioned ratio Y/X is obtained as follows by using a vibrating sample magnetometer (VSM) or superconducting quantum interference device (SQUID).

First, the magnetic powder is sampled into a predetermined form. The format of the sampling, e.g., consolidation to a measurement capsule and pasting to a measurement tape, can be freely performed within a range that does not affect the measurement. Next, the M-H loop of the magnetic powder sample is measured, and an SFD curve is calculated from the obtained M-H curve. For the calculation of the SFD curve, a program attached to a measurement device may be used, or another program may be used. Here, the measurement of the M-H loop is performed at room temperature (23° C.). The ratio Y/X is calculated by regarding the absolute value of the point where the obtained SFD curve crosses the Y axis (dM/dH) as "Y" and the main peak height seen in the vicinity of a coercive force Hc in the M-H loop as "X".

[Method of Producing Magnetic Powder]

Figure 2:
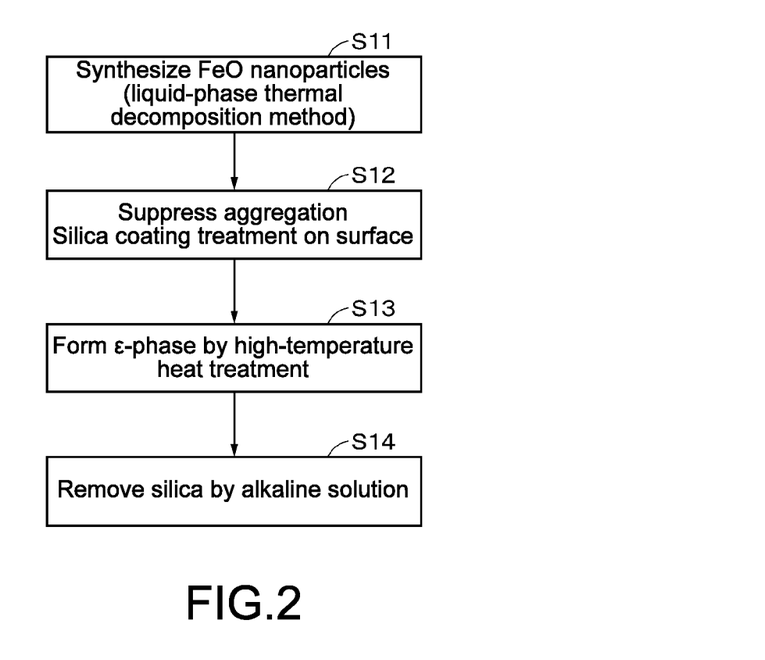
FIG. 2 is a process chart for describing a method of producing a magnetic powder according to a first embodiment of the present technology.

Hereinafter, a method of producing the magnetic powder according to the first embodiment of the present technology will be described with reference to FIG. 2 and Parts A to D of FIG. 3. In the method of producing the magnetic powder, a powder of ε-iron oxide particles is synthesized by using a powder of nanoparticles containing FeO (ferrous oxide) (hereinafter referred to as "FeO particles") as a starting raw material.

(Synthesis of FeO Particles)

Figure 3:
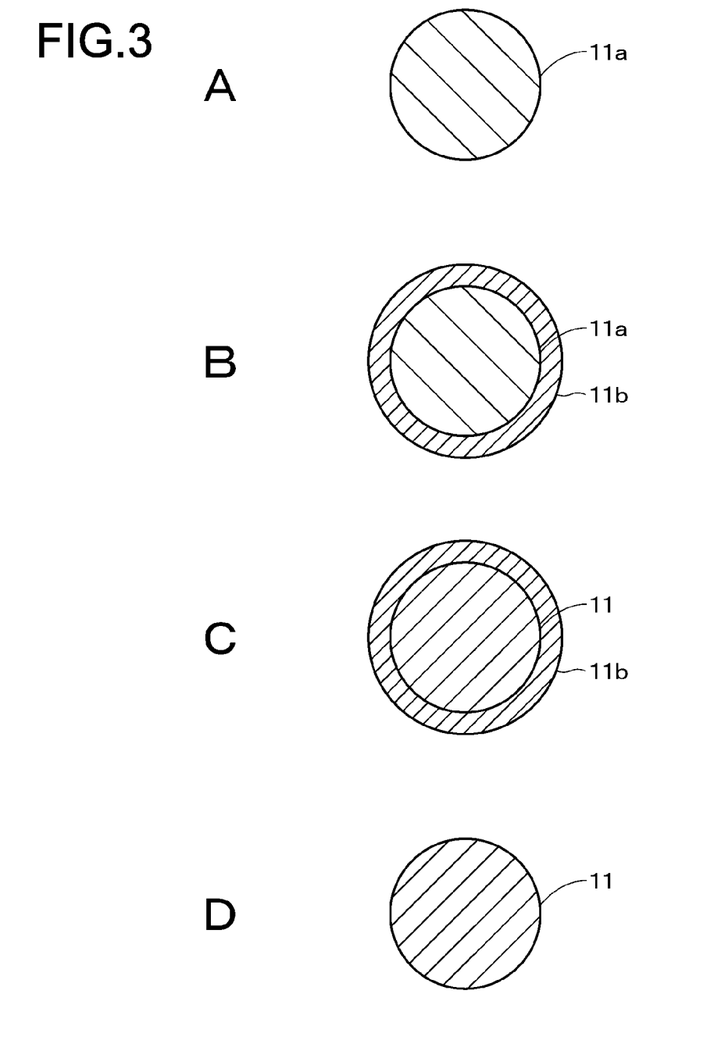
FIG. 3 Parts A to D of FIG. 3 are each a cross-sectional view for describing the method of producing the magnetic powder according to the first embodiment of the present technology.

First, in Step S11, as shown in Part A of FIG. 3, a powder of FeO particles (first particles) 11a as a starting raw material is synthesized in a vacuum by a liquid-phase complex thermal decomposition method. At this time, it is favorable to use oleic acid and oleylamine as a solvent and a ligand. This is because FeO particles with less aggregation can be synthesized. Accordingly, a powder of the FeO particles 11a having sharp particle size distribution can be obtained.

In the above-mentioned step, it is favorable to synthesize the powder of the FeO particles 11a so that the particle size distribution of the powder of the FeO particles 11a is substantially similar to the particle size distribution of the powder of target ε-iron oxide particles. Specifically, it is favorable that the coefficient of variation of the powder of the FeO particles 11a represented by the above-mentioned formula (1) is not more than 30%. This is because the coefficient of variation of the magnetic powder can be reduced to not more than 30%. Note that the coefficient of variation of the powder of the FeO particles 11a is obtained similarly to the coefficient of variation of the above-mentioned magnetic powder.

(Coating Treatment)

Next, in Step S12, silica coating treatment is performed on the surfaces of the FeO particles 11a by a reverse micelle method in order to suppress particle aggregation due to high-temperature heat treatment in the next step. Accordingly, as shown in Part B of FIG. 3, a silica coated layer 11b is formed on the surfaces of the FeO particles 11a.

(High-Temperature Heat Treatment)

Next, in Step S13, the powder of the FeO particles 11a is transformed into a powder of ε-iron oxide particles (second particles) 11 as shown in Part C of FIG. 3 by firing the powder of the FeO particles 11a on which the silica coating treatment has been performed at a high temperature not less than 1000° C.

(Coating Removal)

Finally, in Step S14, as shown in Part D of FIG. 3, a target powder of the ε-iron oxide particles 11 is obtained by removing the silica coated layer 11b on the surfaces of the ε-iron oxide particles 11 by using an alkaline solution.

[Effect]

In the magnetic powder according to the first embodiment, the coefficient of variation of the magnetic powder represented by the above-mentioned formula (1) is not more than 30% and the ratio Y/X of the sub-peak height Y near the zero magnetic field to the main peak height X is not more than 0.5 in the SFD curve of the magnetic powder. Accordingly, the magnetic powder having excellent magnetic properties in which variation in particle size of the ε-iron oxide particles is suppressed is obtained. This magnetic powder is suitable for use as a magnetic recording medium having high density.

In the method of producing the magnetic powder according to the first embodiment, since the powder of ε-iron oxide particles is prepared by performing heat treatment on the powder of FeO particles, it is possible to make the particle size distribution of the powder of ε-iron oxide particles sharp.

In the method of producing the magnetic powder according to the first embodiment, since the powder of FeO particles is synthesized by a liquid-phase complex thermal decomposition method, a powder of FeO particles having sharp particle size distribution can be obtained. Since the powder of ε-iron oxide particles is synthesized by performing heat treatment on the powder of FeO particles having such particle size distribution (i.e., powder of FeO particles in which variation in particle size is small), the formation of α phase and γ phase is suppressed and a powder of ε-iron oxide particles having little impurities and high density can be obtained. Therefore, it is possible to obtain a powder of ε-iron oxide particles in a single phase or a powder of ε-iron oxide particles in an almost single phase.

[Modified Example]

The magnetic powder of the FeO particles 11a may be classified after the step of synthesis of FeO particles and before the step of coating treatment to obtain a powder of the FeO particles 11a having sharper particle size distribution. In this case, since variation in size of the ε-iron oxide particles can be further suppressed, it is possible to obtain a powder of ε-iron oxide particles having more excellent magnetic properties.

Further, in order to adjust the coercive force Hc of the powder of ε-iron oxide particles, the ε-iron oxide particles may be made into a core shell or an additive may be added in the step of producing the powder of ε-iron oxide particles. Note that details of the making of ε-iron oxide particles into a core shell will be described in second and third embodiments.

2 Second Embodiment

[Configuration of Magnetic Powder]

Figure 4:
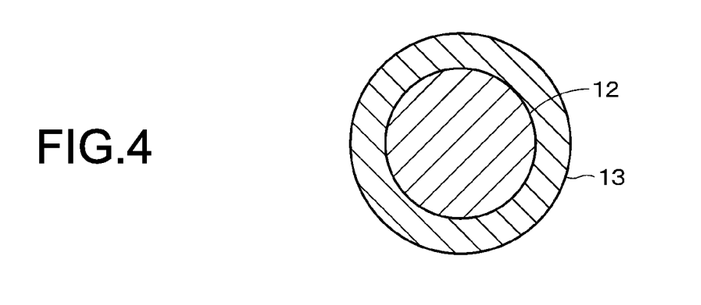
FIG. 4 is a cross-sectional view showing a configuration of a magnetic powder according to a second embodiment of the present technology.

A magnetic powder according to a second embodiment of the present technology is a powder of ε-iron oxide particles having a core-shell structure. As shown in FIG. 4, core-shell particles each include a core portion 12 and a shell portion 13 provided around the core portion 12. The core portion 12 and the shell portion 13 are exchange-coupled. At the interface between the core portion 12 and the shell portion 13, the composition and/or state of the both portions may be varied in a discontinuous manner or in a continuous manner. The magnetic powder according to the second embodiment is suitable for use as a recording layer (magnetic layer) of a magnetic recording medium having high density.

(Core Portion)

The core portion 12 is similar to the ε-iron oxide particles in the first embodiment.

(Shell Portion)

The shell portion 13 covers at least a part of the periphery of the core portion 12. Specifically, the shell portion 13 may partially cover the periphery of the core portion 12 or cover the entire periphery of the core portion 12. From the viewpoint of sufficient exchange-coupling between the core portion 12 and the shell portion 13 and improvement of magnetic properties, it is favorable to cover the entire surface of the core portion 12.

The shell portion 13 contains α-Fe that is a soft magnetic material. The shell portion 13 can be obtained by, for example, reducing the surfaces of ε-iron oxide particles (hard magnetic particles) as a precursor of the core-shell particles. Specifically, for example, the α-Fe contained in the shell portion 13 can be obtained by reducing ε-iron oxide contained in the core portion 12.

[Method of Producing Magnetic Powder]

Figure 5:
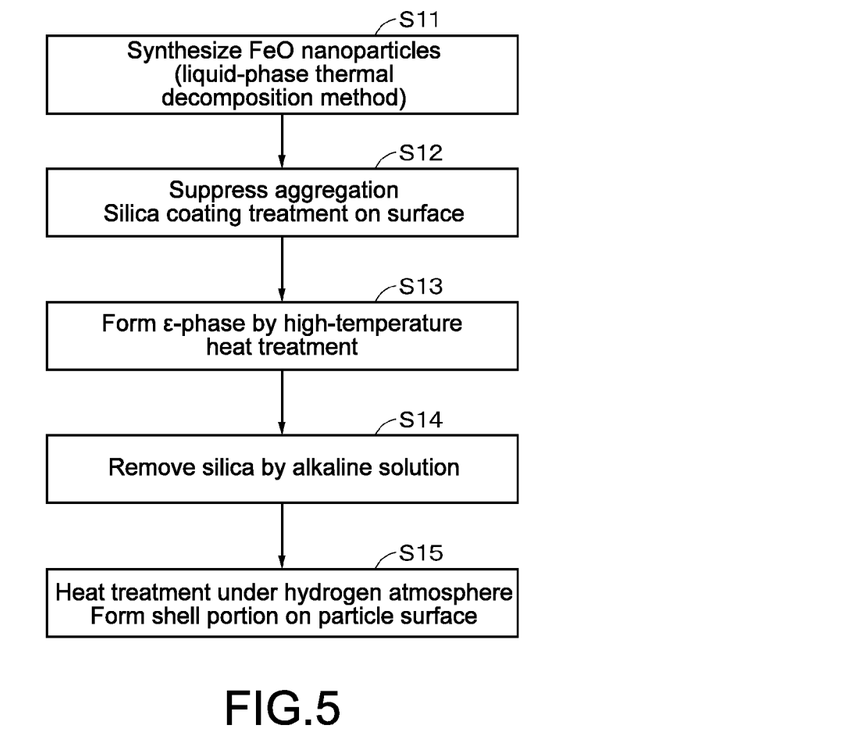
FIG. 5 is a process chart for describing a method of producing the magnetic powder according to the second embodiment of the present technology.

A method of producing the magnetic powder according to the second embodiment of the present technology is different from the method of producing the magnetic powder according to the first embodiment in that the following reduction treatment step (Step S15) after the coating removal step (Step S14) is further included as shown in FIG. 5.

(Reduction Treatment)

In Step S15, reduction treatment is performed on the powder of the ε-iron oxide particles 11 obtained by removing the silica coated layer 11b. Specifically, by performing heat treatment on the above-mentioned powder of the ε-iron oxide particles 11 under a high-temperature hydrogen atmosphere for a certain time period, the surfaces of the particles are reduced. Accordingly, the shell portion 13 containing α-Fe is formed around the core portion 12. In this way, a target powder of ε-iron oxide particles having a core-shell structure is obtained.

[Effect]

The magnetic powder according to the second embodiment contains a powder of the core-shell particles that include the core portion 12 containing ε-iron oxide and the shell portion 13 containing α-Fe. By forming a recording layer of a magnetic recording medium by using this magnetic powder, it is possible to realize a magnetic recording medium having high output, excellent thermal stability, and recordability.

In the method of producing the magnetic powder according to the second embodiment, by performing reduction treatment on ε-iron oxide particles that are hard magnetic particles, the core-shell particles that include the shell portion 13 containing α-Fe that is a soft magnetic material are formed. Accordingly, it is possible to prepare uniform core-shell particles, and cause the exchange interaction between ε-iron oxide particles to be the core portion 12 and α-Fe to be the shell portion 13 to uniformly occur. Therefore, it is possible to take advantage of the characteristics of the soft magnetic material having a high saturation magnetization amount σs, and achieve the high saturation magnetization amount σs as the whole core-shell particles. Similarly for the recordability, the coercive force Hc of the whole core-shell particles can be adjusted to the coercive force Hc suitable for recording while keeping the coercive force Hc of the core portion 12 alone to a large value in order to ensure the thermal stability, thereby making it possible to increase the recordability. Further, since also the ε-iron oxide particles to be the core portion 12 can be made larger than those produced by existing methods, it is easy to maintain a high coercive force Hc, which is advantageous for improving the thermal stability.

Further, in the method of producing the magnetic powder according to the second embodiment, since reduction treatment is directly performed on the surfaces of ε-iron oxide particles prepared in advance, the particle diameter of the ε-iron oxide particles to be a precursor and the particle diameter of the core-shell particles obtained by the reduction treatment are substantially the same. Therefore, by adjusting the particle diameter of the ε-iron oxide particles to be a precursor, it is possible to prepare the core-shell particles having a desired particle diameter. Therefore, it is possible to suppress occurrence of variation in particle size distribution.

3 Third Embodiment

[Configuration of Magnetic Powder]

Figure 6:
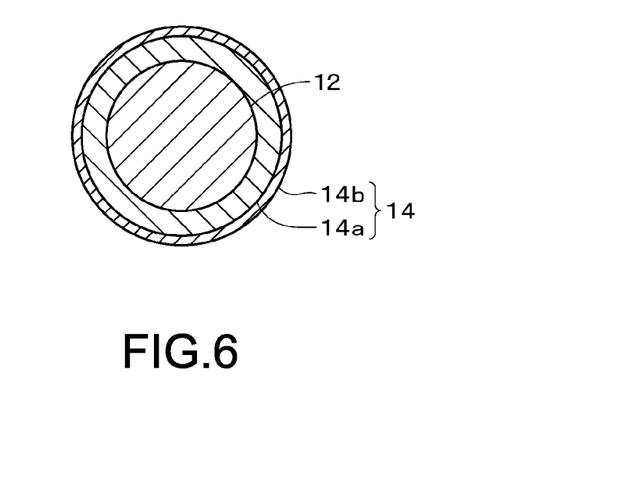
FIG. 6 is a cross-sectional view showing a configuration of a magnetic powder according to a third embodiment of the present technology.

A magnetic powder according to a third embodiment of the present technology is a powder of core-shell particles including the core portion 12 and a shell portion 14 that is provided around the core portion 12 and has a two-layer structure as shown in FIG. 6. The same components as those in the second embodiment will be denoted by the same reference symbols, and description thereof will be omitted.

(Shell Portion)

The shell portion 14 having a two-layer structure includes a first shell portion 14a provided on the core portion 12, and a second shell portion 14b provided on the first shell portion 14a.

(First Shell Portion)

The first shell portion 14a that is a soft magnetic layer is similar to the shell portion 14 in the second embodiment.

(Second Shell Portion 14b)

The second shell portion 14b is an oxide coating film as an oxidation prevention layer. The second shell portion 14b contains a material that can be obtained by oxidizing α-Fe (soft magnetic material) contained in the first shell portion 14a, e.g., at least one iron oxide of $Fe_3O_4$, $Fe_2O_3$, and FeO.

[Method of Producing Magnetic Powder]

Figure 7:
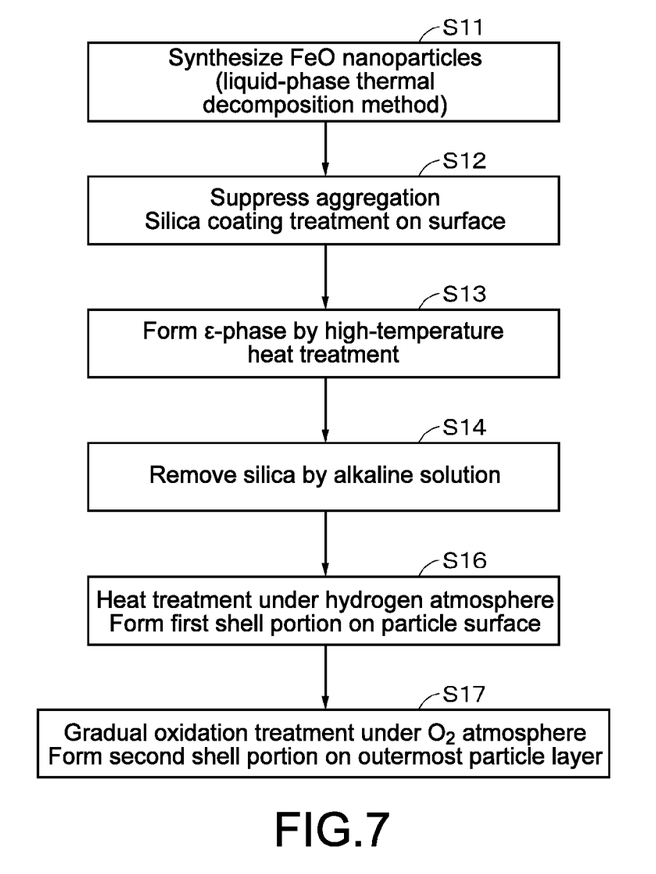
FIG. 7 is a process chart for describing a method of producing the magnetic powder according to the third embodiment of the present technology.

A method of producing the magnetic powder according to the third embodiment of the present technology is different from the method of producing the magnetic powder according to the first embodiment in that the following steps of reduction treatment step (Step S16) and gradual oxidation treatment step (Step S17) are further included after the coating removal step (Step S14) as shown in FIG. 7.

(Reduction Treatment)

In Step S16, reduction treatment is performed on the powder of the ε-iron oxide particles 11 obtained by removing the silica coated layer 11b. Accordingly, the first shell portion 14a containing α-Fe is formed around the core portion 12. Note that the reduction treatment in Step S16 is similar to the reduction treatment in Step S15 in the second embodiment.

(Gradual Oxidation Treatment)

In Step S17, gradual oxidation treatment is performed on the powder of the ε-iron oxide particles 11 whose surfaces are covered by the first shell portion 14a. Specifically, after cooling the above-mentioned powder of the ε-iron oxide particles 11 to room temperature in a nitrogen atmosphere, heat treatment is performed thereon in an atmosphere of $O_2+N_2$ mixed gas to form the second shell portion 14b as an oxide coating film on the outermost layer. Accordingly, it is possible to obtain a powder of core-shell ε-iron oxide particles having excellent oxidation resistance.

[Effect]

In the magnetic powder according to the third embodiment, since the core-shell particles each have the second shell portion 14b on the surface, it is possible to prevent the surfaces of the core-shell particles from being exposed to air to cause rust and the like on the surfaces of the core-shell particles to occur. Therefore, it is possible to suppress the deterioration of characteristics of the magnetic powder.

4 Fourth Embodiment

[Configuration of Magnetic Recording Medium]

Figure 8:
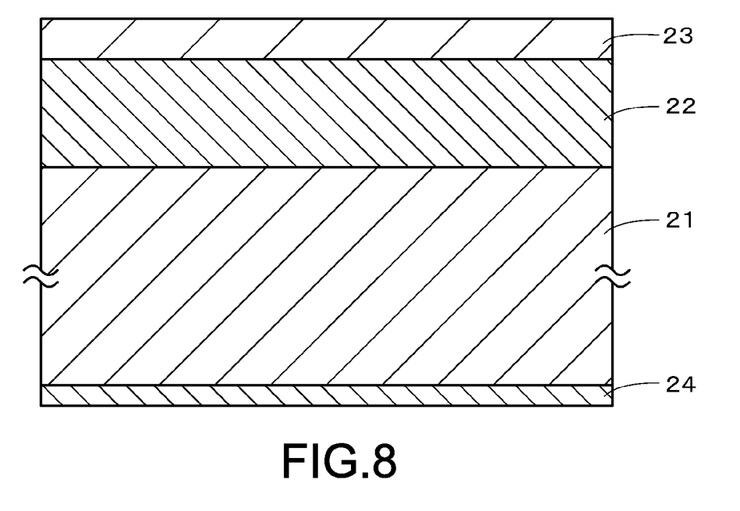
FIG. 8 is a cross-sectional view showing a configuration of a magnetic recording medium according to a fourth embodiment of the present technology.

A magnetic recording medium according to a fourth embodiment of the present technology is a so-called perpendicular magnetic recording medium, and includes an elongated substrate 21, an underlayer (nonmagnetic layer) 22 provided on one main surface of the substrate 21, and a recording layer (magnetic layer) 23 provided on the underlayer 22 as shown in FIG. 8. The magnetic recording medium may further include a protective layer (not shown) provided on the recording layer 23, a lubricant layer (not shown), and the like as necessary. Further, as necessary, a backcoat layer 24 provided on the other main surface of the substrate 21 may be further included.

(SFD)

In the SFD curve, the ratio Y/X of the sub-peak height Y near the zero magnetic field to the main peak height X is not more than 0.5 (see FIG. 1). When the ratio Y/X exceeds 0.5, variation in particle size of the ε-iron oxide particles becomes large, and there is a possibility that magnetic properties of the recording layer 23 are reduced and C/N (Carrier to Noise Ratio) is deteriorated.

The above-mentioned ratio Y/X is obtained as follows. First, the M-H loop of the entire magnetic recording medium is measured using a VSM. After that, the coating films (the underlayer 22, the recording layer 23, and the like) are wiped using acetone and ethanol, or the like to leave the substrate 21 only, and the M-H loop of the substrate 21 is measured for background correction. Here, the measurement of the M-H loop is performed at room temperature (23° C.). After that, the M-H loop after the background correction is calculated by subtracting the M-H loop of the substrate 21 from the M-H loop of the entire magnetic recording medium. After that, the ratio Y/X is obtained in the same way as that in the case of the magnetic powder according to the first embodiment. Note that in the case where the M-H loop after the background correction is not saturated in the measurement of the M-H loop by the VSM, a SQUID that can obtain a higher applied magnetic field is used. The above-mentioned ratio Y/X is a value obtained by performing measurement in the direction perpendicular to the recording layer 23. Further, "demagnetizing field correction" when performing measurement in the perpendicular direction is not performed.

(δ/Mrt)

δ/Mrt satisfies the relationship represented by the following formula (2).

$$2.0 \leq \delta/Mrt \leq 120.0 \qquad (2)$$

(in which δ [nm] is the average thickness of the recording layer 23 and Mrt [mA] is the product of the residual magnetization amount and the thickness of the recording layer 23.)

In the case where the average thickness δ of the recording layer 23 is small, the ratio of the variation of the average thickness δ to the average thickness δ inevitably becomes large, which may result in deterioration of C/N. Meanwhile, in the case where the average thickness δ of the recording layer 23 is large, there is a possibility that the recorded magnetization forms a closed loop in the recording layer 23, which causes a reduction in output and deteriorates C/N. Further, in the case where Mrt is small, there is a possibility that the output is reduced and C/N is deteriorated. Meanwhile, in the case where Mrt is large, there is a possibility that the reproduction head is saturated and favorable C/N is not obtained. In order to suppress the above-mentioned deterioration of C/N, δ/Mrt is set to satisfy the relationship represented by the above-mentioned formula (2).

The above-mentioned ratio δ/Mrt is calculated from δ [nm] and Mrt [mA] obtained as follows.

δ [nm] is obtained as follows. First, a magnetic recording medium to be measured is processed by an FIB (Focused Ion Beam) method or the like to prepare a slice for TEM observation, and the cross section of the slice is observed by TEM. It is favorable that the observation magnification be at least not less than 100,000 times so that the thickness of the recording layer 23 can be clearly observed. The observation of the cross-sectional TEM is performed at total five positions for every 100 m in the longitudinal direction (traveling direction) of the magnetic recording medium. The observation direction at each position is the lateral direction (width direction) of the magnetic recording medium. The thickness of the recording layer 23 is observed at evenly 50 points per field of view, and the average thickness δ[nm] of the recording layer 23 is obtained by simply averaging (arithmetic average) the thicknesses in all five fields of view.

Mrt [mA] is obtained as follows. First, the M-H loop of the magnetic recording medium is measured using a VSM. Next, coating films (the underlayer 22, the recording layer 23, and the like) of the magnetic recording medium are wiped using acetone and ethanol to leave only the substrate 21, and the M-H loop of the substrate 21 alone is measured. Subsequently, by subtracting the M-H loop of the substrate 21 alone from the M-H loop of the magnetic recording medium, the M-H loop after background correction is obtained. Here, the measurement of the M-H loop is performed at room temperature (23° C.). After that, the residual magnetization amount Mr [emu] is obtained from the obtained M-H loop after the background correction, and divided by the area of the measurement sample to calculate Mrt [mA]. Note that in the case where the M-H loop after the background correction is not saturated in the measurement of the M-H loop by the VSM, a SQUID that can obtain a higher applied magnetic field is used.

(Squareness Ratio)

A squareness ratio Rs in the direction perpendicular to the recording layer 23 is favorably not less than 60%. In the case where the squareness ratio Rs is less than 60%, there is a possibility that C/N is reduced.

The squareness ratio Rs [%] is obtained as follows. First, similarly to the case the above-mentioned "δ/Mrt" is obtained, the residual magnetization amount Mr [emu] is obtained. Next, among the M-H loops measured when obtaining the above-mentioned "δ/Mrt", a magnetization amount Ms [emu] of a part where the magnetization amount is saturated by application of a sufficient magnetic field is obtained. Then, by dividing Mr [emu] obtained as described above by Ms [emu], the squareness ratio Rs [%] (=(Mr/Ms)×100) of the M-H loop is calculated. Note that the above-mentioned Mr and Ms each represent a value obtained by performing measurement in the direction perpendicular to the recording layer 23.

(Substrate)

The substrate 21 is an elongated film having flexibility. Examples of the material of the substrate 21 include polyesters such as polyethylene terephthalate, polyolefins such as polyethylene and polypropylene, cellulose derivatives such as cellulose triacetate, cellulose diacetate, and cellulose butyrate, vinyl resins such as polyvinyl chloride and polyvinylidene chloride, plastics such as polycarbonate, polyimide, and polyamideimide, light metals such as aluminum alloys and titanium alloys, and ceramics such as alumina glass. In order to enhance the mechanical strength of the magnetic recording medium, a thin film containing an oxide or the like of Al or Cu may be provided on at least one main surface of the substrate 21.

(Recording Layer)

The recording layer 23 contains, for example, the magnetic powder according to the first embodiment, a binder, and conductive particles. The recording layer 23 may further contain additives such as a lubricant, an abrasive, and a rust inhibitor as necessary.

As the binder, resin having a structure obtained by causing a crosslinking reaction to occur in polyurethane resin, vinyl chloride resin, or the like is favorable. However, the binder is not limited thereto, and other resins may be appropriately blended in accordance with, for example, the physical properties required for the magnetic recording medium. The resin to be blended is not particularly limited as long as it is resin generally used in a coating-type magnetic recording medium.

Examples of the resin include polyvinyl chloride, polyvinyl acetate, vinyl chloride-vinyl acetate copolymer, vinyl chloride-vinylidene chloride copolymer, vinyl chloride-acrylonitrile copolymer, acrylate ester-acrylonitrile copolymer, acrylate ester-vinyl chloride-vinylidene chloride copolymer, vinyl chloride-acrylonitrile copolymer, acrylate ester-acrylonitrile copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, nitrocellulose), styrene butadiene copolymer, polyester resin, amino resin, and synthetic rubber.

Further, examples of thermosetting resin or reactive resin include phenol resin, epoxy resin, urea resin, melamine resin, alkyd resin, silicone resin, polyamine resin, and urea formaldehyde resin.

Further, in order to improve the dispersibility of the magnetic powder, polar functional groups such as $-SO_3M$, $-OSO_3M$, $-COOM$, and $P=O(OM)_2$ may be introduced into the above-mentioned binders. Here, M in the formula represents a hydrogen atom or an alkali metal such as lithium, potassium, and sodium.

Further, examples of the polar functional groups include a side-chain group having a terminal group of $-NR1R2$ or $-NR1R2R3^+X^-$, and a main-chain group of $>NR1R2^+X^-$. Here, R1, R2, and R3 in the formula each represent a hydrogen atom or a hydrocarbon group, and $X^-$ represents a halogen element ion such as fluorine, chlorine, bromine, and iodine, or an inorganic or organic ion. Further, examples of the polar functional groups include also $-OH$, $-SH$, $-CN$, and an epoxy group.

The recording layer 23 may further contain, as nonmagnetic reinforcing particles, aluminum oxide (α, β, or γ alumina), chromium oxide, silicon oxide, diamond, garnet, emery, boron nitride, titanium carbide, silicon carbide, titanium carbide, and titanium oxide (rutile-type or anatase-type titanium oxide).

(Underlayer)

The underlayer 22 is a nonmagnetic layer containing a nonmagnetic powder and a binder as main components. The underlayer 22 may further contain additives of at least one of conductive particles, a lubricant, a curing agent, and a rust inhibitor as necessary.

The nonmagnetic powder may be an inorganic material or an organic material. Further, the nonmagnetic powder may be carbon black or the like. Examples of the inorganic material include a metal, a metal oxide, a metal carbonate, a metal sulfate, a metal nitride, a metal carbide, and a metal sulfide. Examples of the shape of the nonmagnetic powder include, but not limited to, various shapes such as a needle shape, a spherical shape, a cubic shape, and a plate shape. The binder is similar to that in the above-mentioned recording layer 23.

[Method of Producing Magnetic Recording Medium]

Next, an example of the method of producing the magnetic recording medium having the above-mentioned configuration will be described. First, a nonmagnetic powder, a binder, and the like are kneaded and dispersed in a solvent to prepare a coating material for forming an underlayer. Next, the magnetic powder according to the first embodiment, a binder, and the like are kneaded and dispersed in a solvent to prepare a coating material for forming a recording layer. For the preparation of the coating material for forming a recording layer and the coating material for forming an underlayer, for example, the following solvents, dispersing devices, and kneading devices can be used.

Examples of the solvent used for preparing the above-mentioned coating material include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. These may be used alone or mixed appropriately for use.

As the kneading device used for preparing the above-mentioned coating material, for example, kneading device such as a continuous twin-screw kneader, a continuous twin-screw kneader capable of performing dilution in multi-stages, a kneader, a pressure kneader, and a roll kneader can be used. However, the present technology is not particularly limited to these devices. Further, as the dispersing device used for preparing the above-mentioned coating material, for example, dispersing devices such as a roll mill, a ball mill, a horizontal sand mill, a vertical sand mill, a spike mill, a pin mill, a tower mill, a pearl mill (e.g., "DCP mill" manufactured by Nippon Eirich Co., Ltd.) a homogenizer, and an ultrasonic dispersion machine can be used. However, the present technology is not particularly limited these devices.

Next, the coating material for forming an underlayer is coated on one main surface of the substrate 21 and dried to form the underlayer 22. Next, the coating material for forming a recording layer is coated on the underlayer 22 and dried to form the recording layer 23 on the underlayer 22. Note that at the time of drying, the magnetic field of the magnetic powder may be oriented in the thickness direction of the substrate 21 by, for example, a solenoid coil. Next, as necessary, a protective layer and a lubricant layer may be formed on the recording layer 23, or the backcoat layer 24 may be formed on the other main surface of the substrate 21.

Next, the substrate 21 on which the underlayer 22 and the recording layer 23 are formed is rewound around the large-diameter core and hardened. Next, calendaring treatment is performed on the substrate 21 on which the underlayer 22 and the recording layer 23 are formed, and then it is cut into a predetermined a width. Thus, a target magnetic recording medium can be obtained.

[Effect]

In the magnetic recording medium according to the fourth embodiment of the present technology, since the recording layer 23 contains the magnetic powder according to the first embodiment, it is possible to realize a magnetic recording medium having excellent magnetic properties. Therefore, it is possible to reproduce, with low noise, a signal recorded with high density. Therefore, it is possible to achieve high C/N.

[Modified Example]

The recording layer 23 may contain the magnetic powder according to the second or third embodiment instead of the magnetic powder according to the first embodiment. In this case, it is possible to achieve higher C/N than that in the magnetic recording medium according to the fourth embodiment.

EXAMPLE

Hereinafter, the present technology will be specifically described by way of Examples. However, the present technology is not limited to only these Examples.

<i Examples and Comparative Examples Regarding Magnetic Powder>

Example 1A (Synthesis of FeO Nanoparticle)

Figure 9:
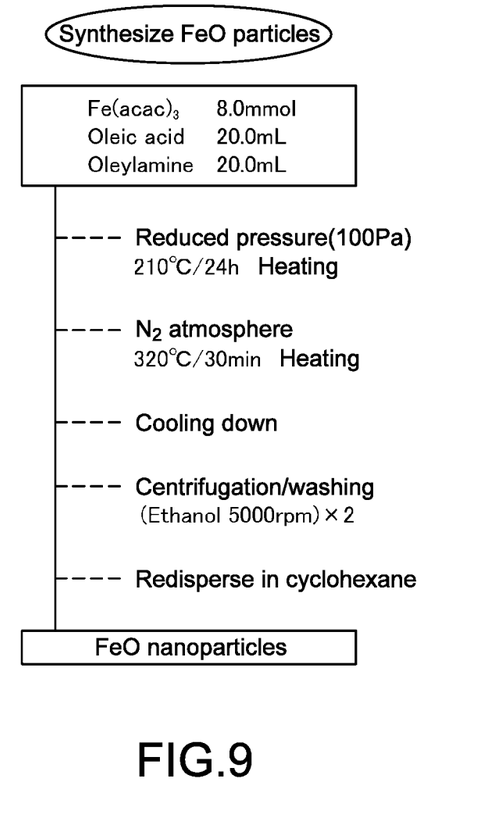
FIG. 9 is a process chart for describing a step of synthesizing FeO nanoparticles.

FIG. 9 shows the outline of a step of synthesizing FeO nanoparticles. First, 8.0 mmol of iron acetylacetonate, 20.0 mL of oleic acid, and 20.0 mL of oleylamine were weighed in a 300 ml round-bottomed three-necked flask and pretreated with heating at 210° C. for 24 h under a reduced pressure atmosphere of 100 Pa.

Next, the atmosphere was switched to an $N_2$ atmosphere, the temperature was increased to 320° C., and heating was performed for 30 min. After that, it was naturally cooled to room temperature, and centrifuged and washed a plurality of times with ethanol to obtain FeO nanoparticles. Finally, the obtained FeO nanoparticles were redispersed in cyclohexane. At this time, the surfaces of the obtained FeO nanoparticles are oxidized to be changed into $Fe_3O_4$ in some cases. However, there is no effect on the generation of ε-iron oxide.

(Silica Coating Treatment)

Figure 10:
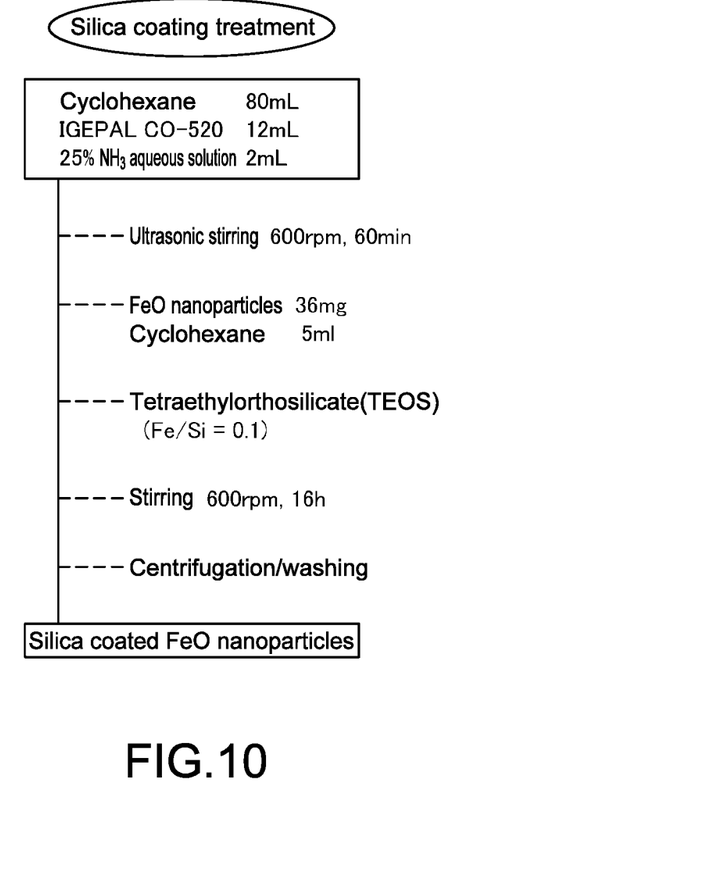
FIG. 10 is a process chart for describing a silica coating treatment step.

FIG. 10 shows the outline of a silica coating treatment step. First, 80 mL of cyclohexane, 12 mL of polyoxyethylene (5) nonylphenyl ether (IGEPAL (registered trademark)), and 2 mL of aqueous ammonia were mixed in a 100 ml eggplant flask, and stirred at 600 rpm for 60 min while applying ultrasonic waves until a transparent uniform solution was obtained.

The FeO nanoparticles previously dispersed in cyclohexane were added thereto, and tetraethylorthosilicate was added dropwise at an arbitrary rate so that the molar ratio of Fe/Si was 0.1. After the dropwise addition, stirring was further continued at 600 rpm for 16 hours. After completion of the reaction, the work of adding methanol and performing centrifugation was repeated a plurality of times to perform washing. The precipitate obtained by the centrifugation was dried in a dryer at 60° C., and silica coated FeO nanoparticles were collected.

(High-Temperature Heat Treatment)

First, the obtained silica coated FeO nanoparticles were put in an alumina crucible and, the crucible was placed in a muffle furnace. After that, the muffle furnace was heated to 1100° C., and firing was performed for 200 hours. As a result, a powder of ε-iron oxide nanoparticles in a substantially single phase was obtained.

(Silica Coating Removal)

Figure 11:
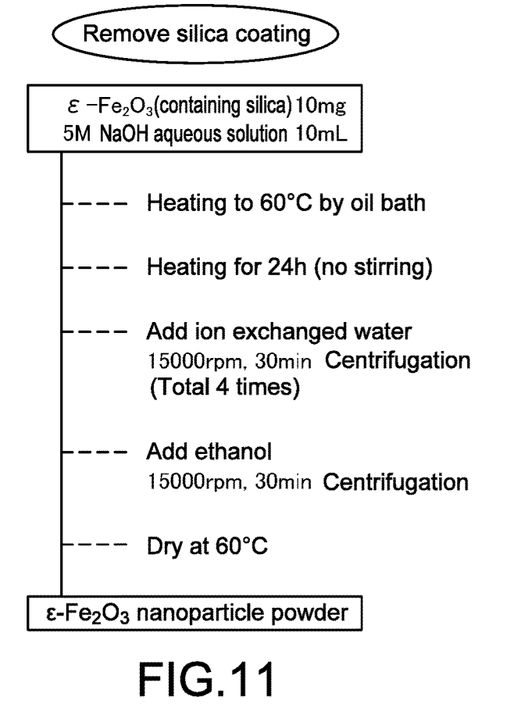
FIG. 11 is a process chart for describing a silica coating removal step.

FIG. 11 shows the outline of a silica coating removal step. First, a powder of the ε-iron oxide nanoparticles and an aqueous NaOH solution adjusted to 5 M were put in a Teflon centrifuge tube, heated to 60° C. by an oil bath, and left to stand for 24 hours. After that, the work of adding ion exchange water and performing centrifugation was repeated a plurality of times. Further, ethanol was added thereto, and it was centrifuged and then dried at 60° C. to obtain a powder of ε-iron oxide nanoparticles from which silica coating had been removed.

Examples 2A and 3A

A powder of ε-iron oxide nanoparticles was obtained in the same way as that in Example 1A except for the following. That is, in the step of synthesizing FeO nanoparticles, the size of FeO nanoparticles to be synthesized was controlled by controlling the time for pre-treatment with heating at 210° C. In Example 2A, the particle size was reduced by increasing the time for pre-treatment with heating to be longer than 24h. Meanwhile, in Example 3A, the particle size was increased by reducing the time for pre-treatment with heating to be shorter than 24h.

Example 4A

First, a powder of ε-iron oxide nanoparticles was obtained in the same way as that in Example 1 except that the particle size of the FeO nanoparticles was reduced by increasing the time for pre-treatment with heating at 210° C. to be longer than 24h. Next, a powder of core-shell ε-iron oxide nanoparticles was obtained by forming an α-Fe layer and an oxidation resistant coating film on the particle surface of the powder of the obtained ε-iron oxide nanoparticles as described below.

(Reduction Treatment and Gradual Oxidation Treatment)

Figure 12:
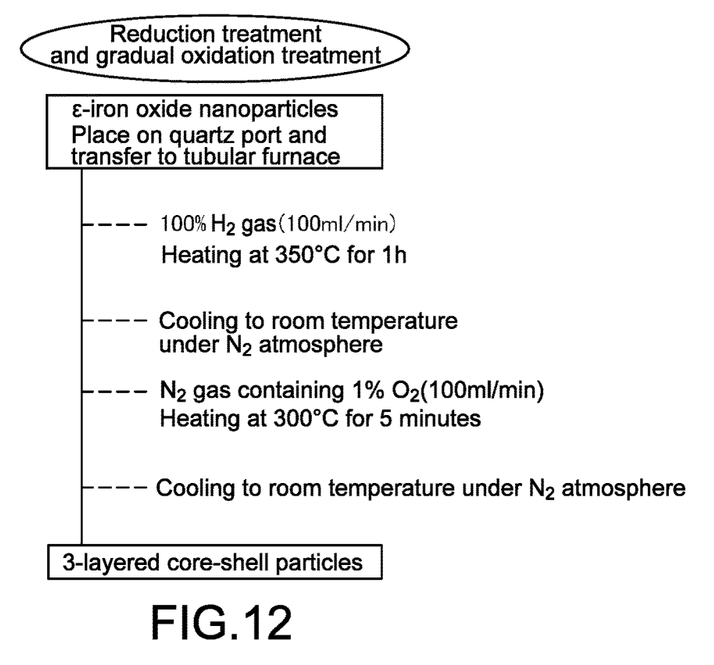
FIG. 12 is a process chart for describing a step of forming an $\alpha$-Fe layer and an oxidation resistant coating film.

FIG. 12 shows the outline of a step of reduction treatment and gradual oxidation treatment. First, a powder of ε-iron oxide nanoparticles was placed on a quartz port, and put in a tubular furnace. After putting, the atmosphere of the tubular furnace was replaced with an $N_2$ atmosphere once, and then, the temperature was increased to a predetermined temperature. After the temperature increase, heat treatment was performed at 350° C. for 1 hour while flowing 100% $H_2$ at the flow rate of 100 ml/min. As a result, the surfaces of ε-iron oxide nanoparticles were reduced and transformed into α-Fe. After that, the atmosphere was replaced with an $N_2$ atmosphere again, and it was cooled to room temperature. After cooling, it was further heated to a predetermined temperature, and heat treatment was performed at 300° C. for 5 minutes while flowing $N_2$ gas containing trace oxygen at the same flow rate. After that, the atmosphere was replaced with an $N_2$ atmosphere again, and it was cooled to room temperature. Accordingly, a powder of core-shell particles having a 3-layer structure, which include an oxidation resistant coating film on the outermost layer, was obtained.

Comparative Example 1A

By the method described in Non-Patent Literature 1, ε-iron oxide nanoparticles were prepared. That is, iron hydroxide-based compound particles were prepared by a reverse micelle method, silica coating was applied to the particles, and then heat treatment was performed to obtain a powder of ε-iron oxide nanoparticles.

Comparative Example 2A

By the method described in Patent Literature 1, ε-iron oxide nanoparticles were prepared. That is, iron oxyhydroxide (α-FeOOH) was used as a raw material powder to obtain a powder of ε-iron oxide nanoparticles.

<ii Example and Comparative Example Regarding Magnetic Tape>

Example 1B (Step of Preparing Coating Material for Forming Recording Layer)

A coating material for forming a recording layer was prepared as follows. First, a first composition having the following formulation was kneaded by an extruder. Next, the first composition and a second composition having the following formulation were added to a stirring tank including a dispersion device, and, premixed. After that, further sand mill mixing was performed, and filter treatment was performed to prepare a coating material for forming a recording layer.

(First Composition)

ε-$Fe_2O_3$ crystal magnetic powder: 100 parts by mass

Vinyl chloride resin (Cyclohexanone solution 30 mass %): 10 parts by mass (Degree of polymerization 300, Mn=10000, containing $OSO_3K$=0.07 mmol/g and secondary OH=0.3 mmol/g as polar groups)

Aluminum oxide powder: 5 parts by mass (α-$Al_2O_3$, average particle diameter 0.2 μm)

Carbon black: 2 parts by mass (Manufactured by TOKAI CARBON CO., LTD., trade name: SEAST TA)

Note that as the above-mentioned ε-$Fe_2O_3$ crystal magnetic powder, the powder of ε-iron oxide nanoparticles according to Example 1A was used.

(Second Composition)

Vinyl chloride resin: 1.1 parts by mass (Resin solution: resin content 30 mass %, cyclohexanone 70 mass %)

n-butyl stearate: 2 parts by mass

Methyl ethyl ketone: 121.3 parts by mass

Toluene: 121.3 parts by mass

Cyclohexanone: 60.7 parts by mass (Step of Preparing Coating Material for Forming Underlayer)

The coating material for forming an underlayer was prepared as follows. First, a third composition having the following formulation was kneaded by an extruder. After that, the third composition and a fourth composition having the following formulation were added to a stirring tank including a dispersion device, and premixed. After that, further sand mill mixing was performed, and filter treatment was performed to prepare a coating material for forming an underlayer.

(Third Composition)

Acicular iron oxide powder: 100 parts by mass (α-$Fe_2O_3$, average major axis length 0.15 μm)

Vinyl chloride resin: 55.6 parts by mass (Resin solution: resin content 30 mass %, cyclohexanone 70 mass %)

Carbon black: 10 parts by mass
(Average particle diameter 20 nm)
(Fourth Composition)
Polyurethane resin UR 8200 (manufactured by TOYOBO CO., LTD.): 18.5 parts by mass
n-butyl stearate: 2 parts by mass
Methyl ethyl ketone: 108.2 parts by mass
Toluene: 108.2 parts by mass
Cyclohexanone: 18.5 parts by mass
(Step of Preparing Coating Material for Forming Backcoat Layer)

A coating material for forming a backcoat layer was prepared as follows. First, the following raw materials were mixed in a stirring tank including a dispersion device, and filter treatment was performed to prepare the coating material for forming a backcoat layer.

Carbon black (manufactured by ASAHI CARBON CO., LTD, trade name: #80): 100 parts by mass
Polyester polyurethane: 100 parts by mass
(Manufactured by Nippon Polyurethane Industry Co., Ltd., trade name: N-2304)
Methyl ethyl ketone: 500 parts by mass
Toluene: 400 parts by mass
Cyclohexanone: 100 parts by mass Next, polyisocyanate (trade name: CORONATE L, manufactured by Nippon Polyurethane Industry Co., Ltd.): 4 parts by mass and myristic acid: 2 parts by mass were added, as curing agents, to each of the coating material for forming a recording layer and coating material for forming an underlayer prepared as described above.

(Coating Step)

Next, an underlayer and a recording layer were formed on a polyethylene naphthalate film (PEN film) having a thickness of 6.2 μm as a nonmagnetic supporting body by using these coating materials as follows. First, the coating material for forming an underlayer was coated on the PEN film and dried to form an underlayer on the PEN film. Next, the coating material for forming a recording layer was coated on the underlayer and dried to form a recording layer on the underlayer. Next, calendaring treatment was performed on the PEN film on which the underlayer and the recording layer were formed to smooth the surface of the recording layer. Note that after the calendaring treatment, the thickness of the underlayer was 1100 nm, and the thickness of the recording layer was 70 nm. Next, the coating material for forming a backcoat layer was coated on the surface opposite to the recording layer to have a film thickness of 0.6 μm and dried to form a backcoat layer.

(Cutting Step)

Finally, the PEN film on which the underlayer, the recording layer, and the backcoat layer were formed as described above was cut to a width of ½ inch (12.65 mm) to obtain a magnetic tape.

Example 2B

The formulation amount of vinyl chloride resin in the second composition in the step of preparing the coating material for forming a recording layer was set to 15.0 parts by mass. In the coating step, the coating amount of the coating material for forming a recording layer was adjusted so that the thickness of the recording layer was 100 nm. In the same way as that in Example 1B except for the above, a magnetic tape was obtained.

Example 3B

The formulation amount of vinyl chloride resin in the first composition in the step of preparing the coating material for forming a recording layer was set to 55 parts by mass. The formulation amount of vinyl chloride resin in the second composition in the step of preparing the coating material for forming a recording layer was changed to 11.6 parts by mass. In the coating step, the coating amount of the coating material for forming a recording layer was adjusted so that the thickness of the recording layer was 60 nm. In the same way as that in Example 1B except for the above, a magnetic tape was obtained.

Example 4B

In the coating step, the powder of ε-iron oxide nanoparticles was perpendicularly oriented in the thickness direction of the PEN film. In the coating step, the coating amount of the coating material for forming a recording layer was adjusted so that the thickness of the recording layer was 65 nm. In the same way as that in Example 1B except for the above, a magnetic tape was obtained.

Example 5B

A magnetic tape was obtained in the same way as that in Example 2B except for that the powder of ε-iron oxide nanoparticles according to Example 2A was used as the $\varepsilon\text{-Fe}_2\text{O}_3$ crystal magnetic powder in the first composition.

Example 6B

A magnetic tape was obtained in the same way as that in Example 2B except for that the powder of ε-iron oxide nanoparticles according to Example 3A was used as the $\varepsilon\text{-Fe}_2\text{O}_3$ crystal magnetic powder in the first composition.

Example 7B

As the $\varepsilon\text{-Fe}_2\text{O}_3$ crystal magnetic powder in the first composition, the powder of ε-iron oxide nanoparticles according to Example 4A was used. In the coating step, the coating amount of the coating material for forming a recording layer was adjusted so that the thickness of the recording layer was 65 nm. A magnetic tape was obtained in the same way as that in Example 2B except for the above.

Comparative Example 1B

A magnetic tape was obtained in the same way as that in Example 2B except for that the powder of ε-iron oxide nanoparticles according to Comparative Example 1A was used as the $\varepsilon\text{-Fe}_2\text{O}_3$ crystal magnetic powder in the first composition.

Comparative Example 2B

A magnetic tape was obtained in the same way as that in Example 2B except for that the powder of ε-iron oxide nanoparticles according to Comparative Example 2A was used as the $\varepsilon\text{-Fe}_2\text{O}_3$ crystal magnetic powder in the first composition.

[Evaluation of Magnetic Powder]

The coefficient of variation and the ratio Y/X of each of the magnetic powders according to Examples 1A to 4A and Comparative Examples 1A and 2A obtained as described above were obtained by the method described in the above-mentioned first embodiment.

[Evaluation of Magnetic Tape]

The δ/Mrt, the squareness ratio Rs, and the ratio Y/X of each of the magnetic tapes according to Examples 1B to 7B and Comparative Examples 1B and 2B obtained as described above were obtained by the method described in the above-mentioned fourth embodiment. Further, C/N of the magnetic tape was obtained as follows.

(C/N)

The recording frequency was set to 10 MHz (recording wavelength 0.2 μm), recording/reproduction was performed with the optimum recording current, the reproduction output value of 10 MHz and the average value of noise of 10 MHz±1 MHz were measured using a spectrum analyzer, and the difference between them was defined as the C/N value. In Table 2, the C/N value of Comparative Example 1B is set to 0 dB, and the relative differences thereto are shown. Note that the relative difference of not less than 3 dB was defined as favorable C/N.

Table 1 shows the evaluation results of the magnetic powders according to Examples 1A to 4A and Comparative Examples 1A and 2A.

methods described in Non-Patent Literature 1 and Patent Literature 1, the coefficient of variation exceeds 30% and the ratio Y/X exceeds 0.5.

From Table 2, the following can be seen.

In Examples 1B to 7B in which recording layers are formed using the ε-iron oxide nanoparticles according to Examples 1A to 4A, δ/Mrt can be in the range of 2.0≤δ/Mrt≤120.0 and the ratio Y/X can be 0.5 or less. Therefore, favorable C/N values were obtained as compared with the cases of Comparative Example 1B and 2B.

Meanwhile, in Comparative Examples 1B and 2B in which recording layers are formed using the ε-iron oxide nanoparticles according to Comparative Examples 1A and 2A, δ/Mrt can be in the range of 2.0≤δ/Mrt≤120.0 but the

TABLE 1

| | Magnetic powder precursor | Precursor synthesis method | Soft magnetic shell | Average particle size (nm$^3$) | Coefficient of variation $\sigma/D_{ave}$ (%) | SFD curve Y/X |
|---|---|---|---|---|---|---|
| Example 1A | FeO | Vacuum liquid-phase thermal decomposition method | No | 2500 | 20 | 0.3 |
| Example 2A | FeO | Vacuum liquid-phase thermal decomposition method | No | 1500 | 28 | 0.4 |
| Example 3A | FeO | Vacuum liquid-phase thermal decomposition method | No | 4000 | 10 | 0.2 |
| Example 4A | FeO | Vacuum liquid-phase thermal decomposition method | With | 2400 | 20 | 0.28 |
| Comparative Example 1A | Iron hydroxide | Reverse micelle method | No | 2500 | 50 | 0.6 |
| Comparative Example 2A | Iron oxyhydroxide | — | No | 2500 | 45 | 0.55 |

Note that in Table 1, the average particle size is expressed as average particle volume [nm$^3$].

Table 2 shows the evaluation results of the magnetic tapes according to Examples 1B to 7B and Comparative Examples 1B and 2B.

ratio Y/X cannot be 0.5 or less. Therefore, only poor C/N values can be obtained as compared with the cases of Examples 1B to 7B.

Although embodiments and Examples of the present technology have been specifically described above, the

TABLE 2

| | Used magnetic powder | Thickness of recoding layer (nm) | Vertical orientation | δ/Mrt | Squareness ratio Rs (%) | SFD curve Y/X | C/N (dB) |
|---|---|---|---|---|---|---|---|
| Example 1B | Example 1A | 70 | No | 35 | 50 | 0.31 | 4.2 |
| Example 2B | Example 1A | 100 | No | 50 | 50 | 0.29 | 3.8 |
| Example 3B | Example 1A | 60 | No | 120 | 50 | 0.3 | 3.2 |
| Example 4B | Example 1A | 65 | With | 21.6 | 80 | 0.25 | 4.6 |
| Example 5B | Example 2A | 100 | No | 51 | 50 | 0.38 | 4.2 |
| Example 6B | Example 3A | 100 | No | 48 | 50 | 0.21 | 3.2 |
| Example 7B | Example 4A | 65 | No | 32.5 | 50 | 0.28 | 4.5 |
| Comparative Example 1B | Comparative Example 1A | 100 | No | 50 | 45 | 0.63 | 0.0 |
| Comparative Example 2B | Comparative Example 2A | 100 | No | 50 | 47 | 0.54 | 2.1 |

From Table 1, the following can be seen.

In Examples 1A to 4A in which ε-iron oxide nanoparticles are synthesized by performing heat treatment on FeO nanoparticles, the coefficient of variation can be 30% or more and the ratio Y/X can be 0.5 or less.

Meanwhile, in Comparative Examples 1A and 2A in which ε-iron oxide nanoparticles are synthesized by the present technology is not limited to the above-mentioned embodiments and Examples and various modifications can be made on the basis of the technical idea of the present technology.

For example, the configurations, the methods, the steps, the shapes, the materials, and the numerical values cited in the above-mentioned embodiments and Examples are only illustrative, and different configurations, methods, steps, shapes, materials, and numerical values may be used as necessary.

Further, the configurations, the methods, the steps, the shapes, the materials, and the numerical values in the above-mentioned embodiments and Examples can be combined without departing from the essence of the present disclosure.

Further, the present technology may take the following configurations.

(1)

A method of producing a magnetic powder, including:

performing heat treatment on first particles that contain ferrous oxide to prepare second particles that contain ε-iron oxide.

(1)

The method of producing the magnetic powder according to (1), further including performing reduction treatment on the second particles.

(3)

The method of producing the magnetic powder according to (2), further including performing oxidation treatment on the second particles on which the reduction treatment has been performed.

(4)

The method of producing the magnetic powder according to any one of (1) to (3), further including:

performing silica coating treatment on the first particles before the heat treatment; and removing silica coating on the second particles after the heat treatment.

(5)

The method of producing the magnetic powder according to any one of (1) to (4), further including preparing the first particles by a liquid-phase thermal decomposition method before the heat treatment.

(6)

A magnetic powder, including:

particles containing ε-iron oxide, in which a coefficient of variation represented by the following formula (1) is not more than 30%, and a ratio Y/X of a sub-peak height Y near a zero magnetic field to a main peak height X in an SFD (Switching Field Distribution) curve is not more than 0.5.

Coefficient of variation [%]=([Standard deviation of particle diameter]/[Average particle diameter])×100    (1)

(7)

The magnetic powder according to (6), in which each of the particles includes a core portion containing ε-iron oxide, and a shell portion containing α-Fe.

(8)

The magnetic powder according to (6), in which each of the particles includes a core portion containing ε-iron oxide, a first shell portion containing α-Fe, and a second shell portion that is provided on the first shell portion and contains iron oxide.

(9)

The magnetic powder according to any one of (6) to (8), in which each of the particles further contains metal other than iron.

(10)

A magnetic recording medium, including:

a recording layer that includes particles containing ε-iron oxide, in which

δ/Mrt satisfies a relationship represented by the following formula (2), and a ratio Y/X of a sub-peak height Y near a zero magnetic field to a main peak height X in an SFD (Switching Field Distribution) curve is not more than 0.5.

$2.0 \leq \delta/Mrt \leq 120.0$    (2)

(in which δ [nm] is an average thickness of the recording layer and Mrt [mA] is a product of a residual magnetization amount and a thickness of the recording layer.)

(11)

The magnetic recording medium according to (10), in which a squareness ratio in a direction perpendicular to the recording layer is not less than 60%.

REFERENCE SIGNS LIST

11 ε-iron oxide particles (second particles)
11 FeO particles (first particles)
12 core portion
13, 14 shell portion
14a first shell portion
14b second shell portion
21 substrate
22 underlayer
23 recording layer

The invention claimed is:

1. A magnetic recording medium, comprising:
a recording layer that includes particles containing ε-iron oxide including a ε-Fe$_2$O$_3$ crystal,
wherein the ε-Fe$_2$O$_3$ includes a pure ε-Fe$_2$O$_3$ crystal in which a Fe site is not substituted with another element,
wherein
δ/Mrt [nm/mA] satisfies a relationship represented by the following formula (2):

$2.0 \leq \delta/Mrt \leq 120.0$    (2), wherein δ [nm] is an average thickness of the recording layer and Mrt [mA] is a product of a residual magnetization amount and a thickness of the recording layer,
wherein a ratio Y/X of a sub-peak height Y near a zero magnetic field to a main peak height X in an SFD (Switching Field Distribution) curve is not more than 0.5,
wherein a coefficient of variation is not more than 30%, and
wherein the coefficient of variation is represented by the following formula (1):
coefficient of variation [%]=([Standard deviation of particle diameter]/[Average particle diameter])×100. . . (1).

2. The magnetic recording medium according to claim 1, wherein a squareness ratio in a direction perpendicular to the recording layer is not less than 60%.

3. The magnetic recording medium according to claim 1, wherein each of the particles includes a core portion containing ε-iron oxide, and a shell portion containing α-Fe.

4. The magnetic recording medium according to claim 1, wherein each of the particles includes a core portion containing ε-iron oxide, a first shell portion containing α-Fe, and a second shell portion that is provided on the first shell portion and contains iron oxide.

5. The magnetic recording medium according to claim 1, wherein the $\varepsilon$-$Fe_2O_3$ crystal is in a single phase.

6. The magnetic recording medium according to claim 1, wherein the $\varepsilon$-$Fe_2O_3$ crystal further includes an $\varepsilon$-$Fe_2O_3$ metal crystal including a metal element in addition to iron.

7. The magnetic recording medium according to claim 6, wherein the metal element includes one or more of Al, Ga, and In.

8. The magnetic recording medium according to claim 6, wherein a molar ratio of the metal element (M) and Fe (M:Fe) is expressed as x:(2−x), where 0<x<1.

9. The magnetic recording medium according to claim 1, further comprising a substrate and an underlayer provided on a main surface of the substrate, wherein the recording layer is provided on the underlayer.

10. The magnetic recording medium according to claim 9, wherein the underlayer includes a nonmagnetic layer.

11. The magnetic recording medium according to claim 1, wherein the coefficient of variation is not more than 20%.

* * * * *